US008463783B1

(12) United States Patent
Yagnik

(10) Patent No.: US 8,463,783 B1
(45) Date of Patent: Jun. 11, 2013

(54) ADVERTISEMENT SELECTION DATA CLUSTERING

(75) Inventor: Niyati Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 614 days.

(21) Appl. No.: 12/498,036

(22) Filed: Jul. 6, 2009

(51) Int. Cl.
*G06F 17/30* (2006.01)
(52) U.S. Cl.
USPC .......................................... 707/737
(58) Field of Classification Search
USPC .......................... 707/737; 705/14.4
See application file for complete search history.

(56) References Cited

U.S. PATENT DOCUMENTS

| 7,610,313 | B2* | 10/2009 | Kawai et al. ........................ 1/1 |
| 7,831,472 | B2* | 11/2010 | Yufik ........................ 705/14.4 |
| 7,877,404 | B2* | 1/2011 | Achan et al. ................... 707/768 |
| 2005/0222981 | A1 | 10/2005 | Lawrence et al. |
| 2006/0069616 | A1 | 3/2006 | Bau |
| 2008/0154684 | A1 | 6/2008 | Kniaz et al. |
| 2008/0270364 | A1 | 10/2008 | Bayardo et al. |
| 2009/0006207 | A1 | 1/2009 | Datar et al. |
| 2009/0192986 | A1 | 7/2009 | Garg et al. |
| 2011/0016005 | A1 | 1/2011 | Li et al. |

* cited by examiner

*Primary Examiner* — Rehana Perveen
*Assistant Examiner* — Hung Havan
(74) *Attorney, Agent, or Firm* — Fish & Richardson P.C.

(57) ABSTRACT

An ad-selection analysis subsystem ("analysis subsystem") analyzes advertisement selection data to identify relevant queries for advertisements. Advertisement selection data for each advertisement in a set of advertisements are represented as a vector of terms corresponding to search queries for which the corresponding advertisement was provided with search results and, in turn, selected by a user. A clustering algorithm is applied to the advertisement selection data for the set of advertisements to identify clusters of search queries and corresponding clusters of advertisements. Identified clusters can be used, for example, to facilitate query expansion, advertisement selection, and keyword generation.

15 Claims, 6 Drawing Sheets

ADVERTISEMENT SELECTION DATA CLUSTERING

BACKGROUND

This document relates to information processing.

The Internet enables access to a wide variety of resources. For example, video, audio, webpages directed to particular subject matter, news articles, images, and other resources are accessible over the Internet. The wide variety of resources that are accessible over the Internet has enabled opportunities for advertisers to provide targeted advertisements with the resources. For example, an advertisement can be targeted for presentation with resources directed to subject matter to which the advertisement is relevant.

The subject matter to which an advertisement is relevant can be identified from targeting keywords that are associated with the advertisement. For example, an advertisement for basketballs being sold by a sporting goods store can be associated with the targeting keyword "basketball." Advertisements can be selected for presentation when resources relevant to the targeting keyword are provided. For example, advertisements associated with a targeting keyword "basketball" can be provided with a search results webpage that is provided in response to a search query "basketball."

Similarly, advertisements can be presented with other resources that are relevant to targeting keywords associated with the advertisements. For example, resource keywords that identify topics to which the content of a resource belong, can be used to identify the advertisements having targeting keywords that match the resource keywords.

There are many different terms or phrases, referred to collectively throughout this document as terms, that can be associated with an advertisement or a resource that are relevant to the content of the respective advertisement or resource. Accordingly, it can be difficult for an advertiser or publisher to efficiently specify terms or phrases that are relevant to the advertisement, particularly when users that are interested in the product being advertised may be providing many different search queries directed to the same topics.

SUMMARY

An ad-selection analysis subsystem analyzes advertisement selection data to identify relevant queries for advertisements. Advertisement selection data for each advertisement in a set of advertisements are represented as a vector of terms corresponding to search queries for which the corresponding advertisement was provided with search results and, in turn, selected by a user. A clustering algorithm is applied to the advertisement selection data for the set of advertisements to identify clusters of search queries and corresponding clusters of advertisements. Identified clusters can be used, for example, to facilitate query expansion, advertisement selection, and keyword generation.

Some aspects of the subject matter described can be implemented in a method performed by a data processing device and including the acts accessing selection data for a plurality of advertisements, the selection data specifying search queries for which the advertisements were presented and user selections of the advertisements in response to the presentations; identifying clusters of terms and corresponding advertisements based on the selection data; computing similarity measures between pairs of clusters of terms, each similarity measures being a measure of similarity between a first cluster of terms and at least one other cluster of terms; receiving a request for data identified as relevant to specified text, the data being identified as relevant based on the data being included in relevant clusters for the specified text, the relevant clusters including at least one cluster in which a term matches the specified text; and providing to a requesting device for which the request was received, data identified as relevant to the specified text. Other implementations of this aspect include corresponding systems, apparatus, and computer program products.

These and other implementations can optionally include one or more of the following features. The data identified as relevant to the specified text can be provided by providing data comprises providing search queries from the identified clusters having a relevance measure for the specified text that meets a relevance threshold. The data identified as relevant to the specified text can be provided by providing advertisements corresponding to the identified clusters having a relevance measure for the specified text that meets a relevance threshold, the relevance threshold being a minimum relevance measure for the specified text that an identified cluster must have to be identified as relevant to the specified text. The clusters of terms and corresponding advertisement can be identified by generating vectors of selection data for each of the advertisements, each of the vectors including weights corresponding to a measure of selections of the advertisement when presented based on the search queries; providing the vectors as input to a clustering algorithm; and receiving cluster data specifying clusters of terms and corresponding advertisements.

Particular aspects of the subject matter described can be implemented to realize one or more of the following advantages. Keywords can be recommended for resources by identifying clusters to which text associated with resources belong by identifying terms that belong to a common cluster as the text. Advertisements can be identified as relevant to specified text irrespective of the advertisement not having a keyword that matches the specified text by identifying advertisements having keywords that belong to a common cluster as the specified text. The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

An ad-selection analysis subsystem ("analysis subsystem") analyzes advertisement selection data to identify relevant queries for advertisements. Advertisement selection data for each advertisement in a set of advertisements are represented as a vector of terms corresponding to search queries for which the corresponding advertisement was provided with search results and, in turn, selected by a user. A clustering algorithm is applied to the advertisement selection data for the set of advertisements to identify clusters of search queries and corresponding clusters of advertisements. Identified clusters can be used, for example, to facilitate query expansion, advertisement selection, and keyword generation.

For example, in response to receipt of a search query, terms that are included in common clusters with the received query can be identified and provided as expanded queries. Similarly, advertisements associated with clusters in which the received query is included can be selected as relevant advertisements for the received query. Further, clusters of keywords that are relevant to content of a publisher's property (or advertiser's advertisement) can be identified as relevant to the content of the property (or advertisement) and associated with the property (or advertisement) to facilitate selection of content-targeted advertisements for presentation with the publisher's property.

In some implementations, an analysis subsystem can be implemented as an element of an advertisement management system in an online environment. In other implementations, the analysis subsystem can be implemented in a processing device that communicates over a network or directly with an advertisement management system.

Figure 1:
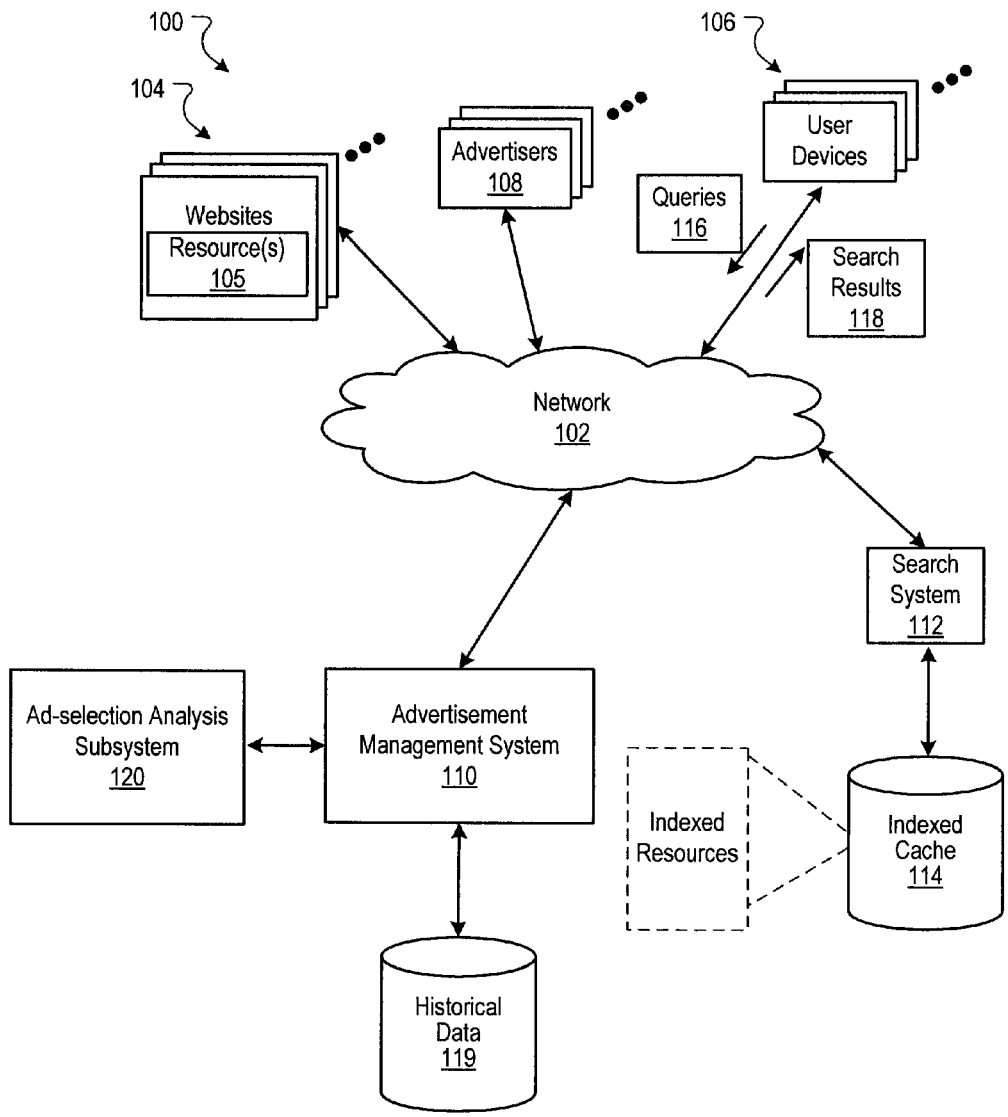
FIG. 1 is a block diagram of an example environment in which an advertisement management system manages advertising services.

FIG. 1 is a block diagram of an example environment 100 in which an advertisement management system 110 manages advertising services. The example environment 100 includes a network 102 such as a local area network (LAN), wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that manages and/or owns the website 104.

A resource 105 is any data that can be provided by the website 104 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window) in which advertisements can be presented. These specified portions of the resource or user display are referred to as advertisement slots.

To facilitate searching of these resources, a search system 112 identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results are requested by a user device 106, the advertisement management system 110 receives a request for advertisements to be provided with the resource or search results. The request for advertisements can include characteristics of the advertisement slots that are defined for the requested resource or search results page can be provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, resource keywords of a requested resource or a search query 116 for which search results are requested can also be provided to the advertisement management system 110.

A resource keyword is text that indicates a topic for which the resource is identified as relevant. A publisher of the resource can explicitly associate resource keywords with a resource that are indicative of topics to which the resource is relevant. Additionally, resource keywords can be associated with a resource based on an analysis of the content of the resource, as described below with reference to FIGS. 3-5.

The advertisement management system 110 can select, for presentation, advertisements having characteristics matching the characteristics of advertisement slots and that are identified as relevant to specified resource keywords or search queries 116. In some implementations, advertisements having targeting keywords that match the resource keywords or search query 116 are selected by the advertisement management system 110 to be provided with the resource.

A targeting keyword can match a resource keyword or a search query by having the same textual content ("text") as the resource keyword or search query. For example, an advertisement associated with the targeting keyword "basketball" can be selected for presentation with a resource having the resource keyword "basketball." Similarly, the advertisement can be selected for presentation with a search results page provided for the search query "basketball."

A targeting keyword can also match a resource keyword or a search query by having text that is identified as being relevant to a targeting keyword or search query despite having different text than the targeting keyword. For example, an advertisement having the targeting keyword "basketball"

may also be selected for presentation with a resource keyword or search query for "sports" because basketball is a type of sport, and, therefore, is relevant to the term "sports."

The search queries and/or resource keywords to which a particular targeting keyword is relevant can be determined based on advertisement selection data associated with the advertisements when presented with search results pages for search queries. For example, targeting keywords for advertisements having a higher selection rate when presented with search results pages for a particular query are more likely to be relevant to the particular search query than targeting keywords for advertisements having a lower selection rate relative to the particular query.

The advertisement management system 110 includes an analysis subsystem 120 to analyze advertisement selection data. In some implementations, the analysis subsystem 120 includes one or more processors configured to identify clusters of terms that are relevant to search queries based on the advertisement selection data.

The analysis subsystem 120 receives advertisement selection data for a set of advertisements that specify the search queries for which the advertisements were selected by a user. The advertisement selection data can be received, for example, from the historical data store 119 that stores data identifying previous presentations of advertisements with search results pages for search queries and subsequent selections of the advertisements.

Analysis subsystem 120 generates vectors for the advertisements in the set of advertisements based on the advertisement selection data and targeting keywords that are associated with the advertisements. The analysis subsystem 120 identifies clusters of advertisements, targeting keywords and search queries based on the vectors. The clusters are represented by cluster data, which can be used for search query expansion, resource keyword suggestion and to select, for presentation, advertisements that are relevant to specified text.

Figure 2:
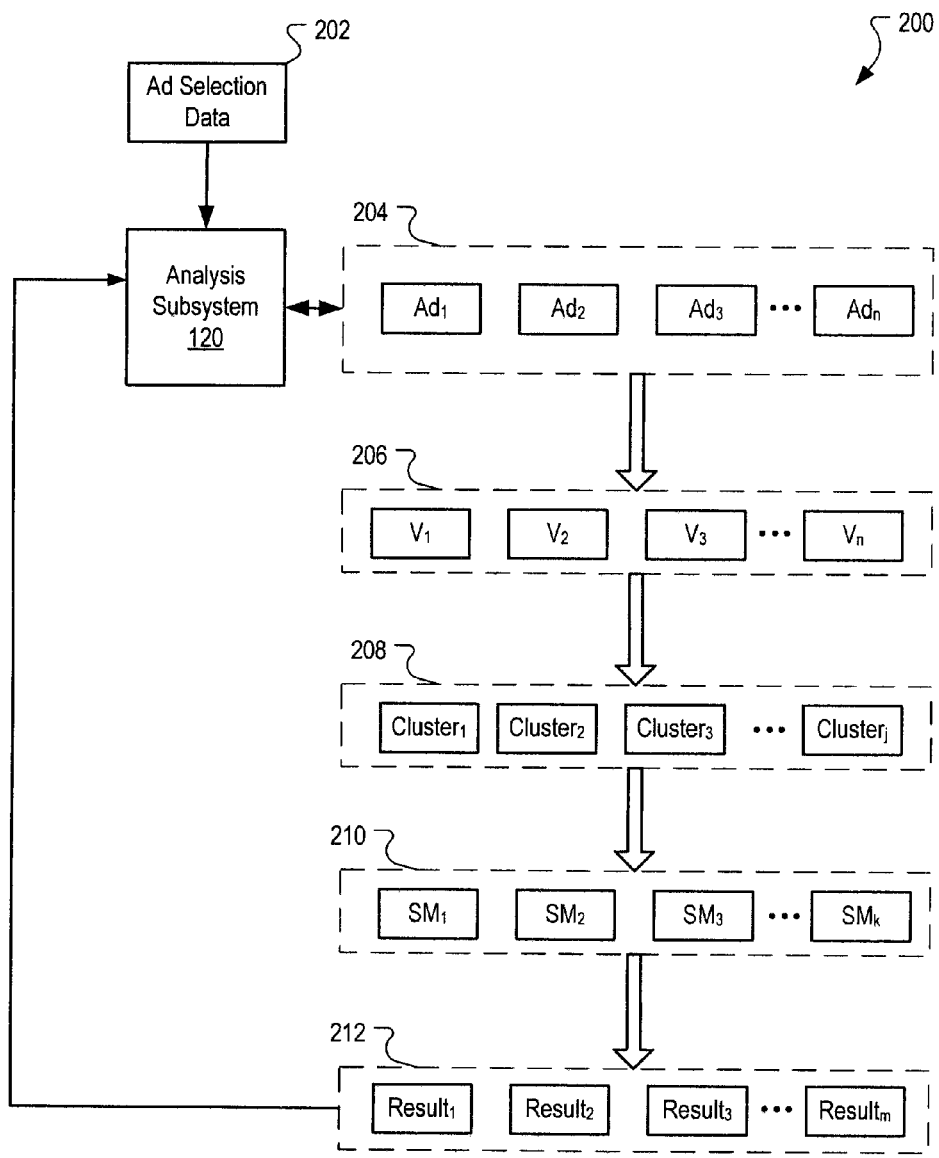
FIG. 2 is a block diagram of an example process flow for identifying clusters based on advertisement selection data.

FIG. 2 is a block diagram of an example process flow 200 for identifying clusters based on advertisement selection data. The analysis subsystem 120 receives advertisement selection data 202 as an input. The analysis subsystem 120 receives the advertisement selection data 202, for example, from a data store storing data that identifies advertisements that were selected when presented with a search results page for the search queries, such as the historical data store 119 of FIG. 1.

The analysis subsystem 120 identifies, from the advertisement selection data, advertisements ($Ad_1$-$A_n$) that were selected by users when presented with a search results page for a search query and define a set of advertisements 204. For each advertisement in the set of advertisements 204, the analysis subsystem 120 identifies search queries for which the advertisement was presented and selected, and the targeting keywords that are associated with the advertisement. Based on the identified search queries and targeting keywords, the analysis subsystem 120 generates a vector representing the queries for which the advertisement was selected and the targeting keywords for the advertisement, as described in more detail with reference to FIG. 4. The vectors $V_1$-$V_n$ for the advertisements 204 define a set of vectors 206.

Once the analysis subsystem 120 generates the vectors ($V_1$-$V_n$) that define the set of vectors 206, the analysis subsystem 120 identifies vector clusters ($cluster_1$-$cluster_j$) that define a set of vector clusters 208. Each vector cluster in the set of vector clusters 208 can be identified, for example, based on a clustering algorithm that identifies the vectors that are within a specified distance of other vectors in the vector cluster. Generation of vector clusters is described in more detail with reference to FIG. 4.

The analysis subsystem 120 then generates similarity measures ($SM_1$-$SM_k$) that define a set of similarity measures 210. Each similarity measure represents the similarity between two vector clusters. The similarity measures can be, for example, cosine similarity measures of the vectors that are included in the respective vector clusters. Generation of similarity measures is described in more detail with reference to FIG. 4.

The analysis subsystem 120 then generates results ($Result_1$-$Result_m$) that define a set of results 212 based on the similarity measures. Each result in the set of results 212 identifies a pair of clusters having similarity measures that exceed a threshold similarity. These pairs of clusters are referred to as co-related clusters. The set of results 212 can be indexed in a manner such that each co-related cluster for a particular cluster is indexed based on an identifier associating the co-related cluster with the particular cluster. Therefore, when the particular cluster is identified as being relevant to specified text, the co-related clusters can also be identified as clusters that are relevant to the specified text based on their association with the identifier. Thus, the terms and advertisements from the particular cluster as well as the co-related clusters will be available for suggestion as relevant data for the specified text.

In some implementations, the specified text can be text included in a search query. For example, when a search query including the text "basketball" is received, the specified text can be the text "basketball." The specified text can also be text that is associated with a resource. For example, a resource keyword or n-grams of text that appear on a resource can be identified as the specified text when suggested resource keywords are requested.

Figure 3:
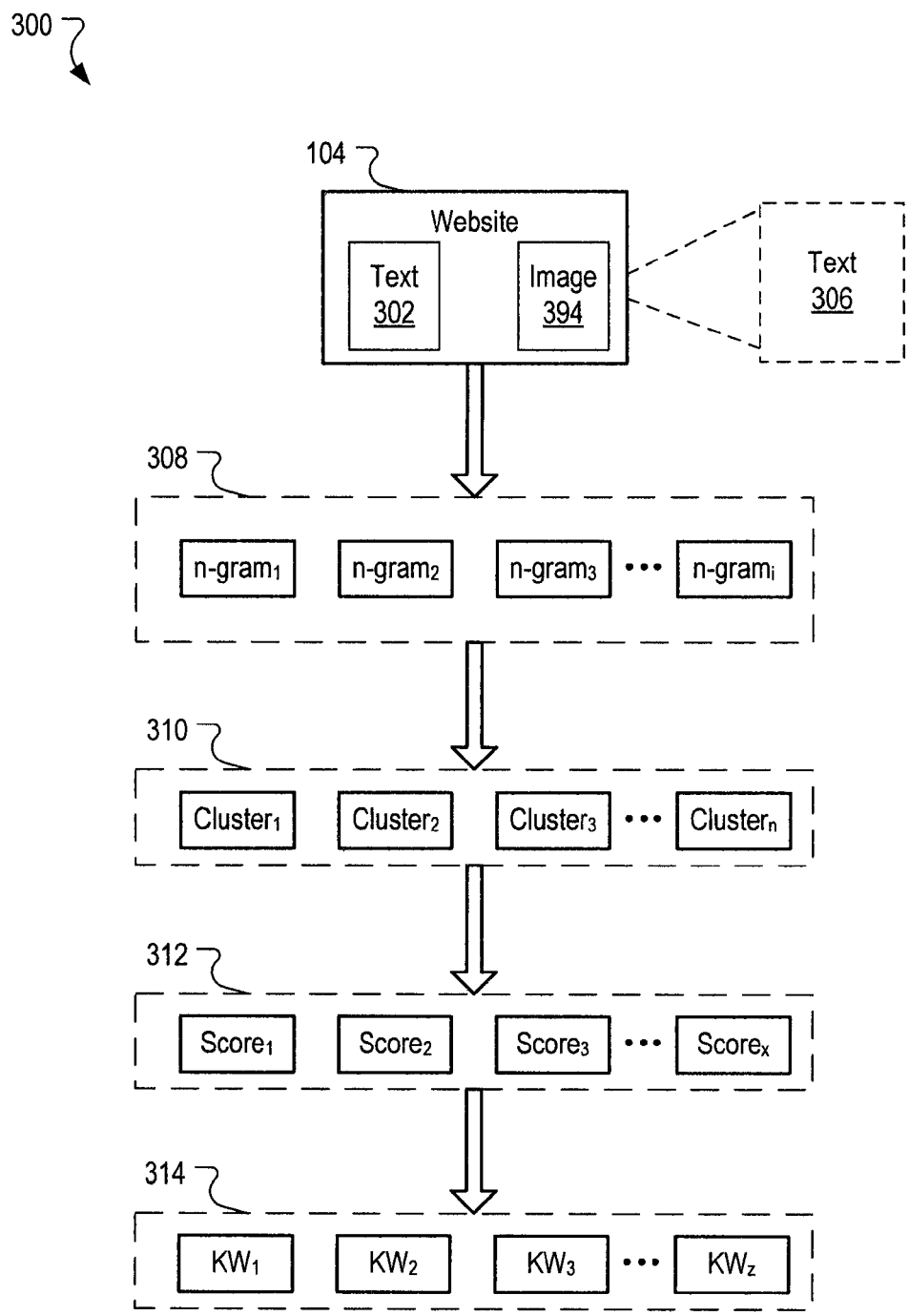
FIG. 3 is a block diagram of an example process flow for generating resource keywords for a website.

In addition to using the set of clusters for identifying advertisements for presentation and keyword expansion applications, the set of clusters 208 and corresponding set of results 212 can also be used to suggest or provide keywords that are relevant to specified text. For example, resource keywords that are relevance to specified text associated with the resource can be identified and suggested using the sets of clusters 208 and corresponding set of results. FIG. 3 is a block diagram of an example process flow 300 for generating resource keywords for a website.

The analysis subsystem 120 can receive or identify content of a website 104 for which resource keywords are to be suggested. The content of the website can include page text 302 and images 304 that are presented to a user when the website is rendered on a display by a user device as well as other text 306 that is otherwise associated with the webpage. The other text 306 can include, for example, resource keywords that are associated with the website 104, anchor text on other websites for links to the website 104, filenames for the text 302 that appears on the website 104 and other metadata associated with the website 104. The description below refers only to the text 302 to simplify the explanation, but the description is equally applicable to the other text 306 of a website 104.

The analysis subsystem 120 parses the text 302 into n-grams ($n\text{-}gram_1$-$n\text{-}gram_i$) of text that define a set of n-grams 308. The analysis subsystem 120 identifies relevant vector clusters ($cluster_1$-$cluster_x$) that define a set of relevant vector clusters 310 to which the n-grams ($n\text{-}gram_1$-$n\text{-}gram_i$) correspond. The set of relevant vector clusters 310 can be a subset of the set of vector clusters 208 described above. For example, vector clusters in the set of vector clusters 208 that include an instance of an n-gram in the set of n-grams 308 can be identified by the analysis subsystem 120 as a relevant vector cluster to which the n-gram corresponds.

The analysis subsystem 120 generates scores ($score_1$-$score_x$) for each term in the set of relevant clusters 310. The scores define a set of scores 312 for each of the n-grams 308. Each score represents a measure of similarity of an n-gram to a term in a cluster corresponding to the n-gram. Based on the scores, the analysis subsystem 120 selects terms having at least a threshold score as keywords ($KW_1$-$KW_z$) that define a set of reference keywords 314 for the website 104. Generating the set of scores 312 and selection of the set of keywords 314 are described in more detail with reference to FIG. 5.

Figure 4:
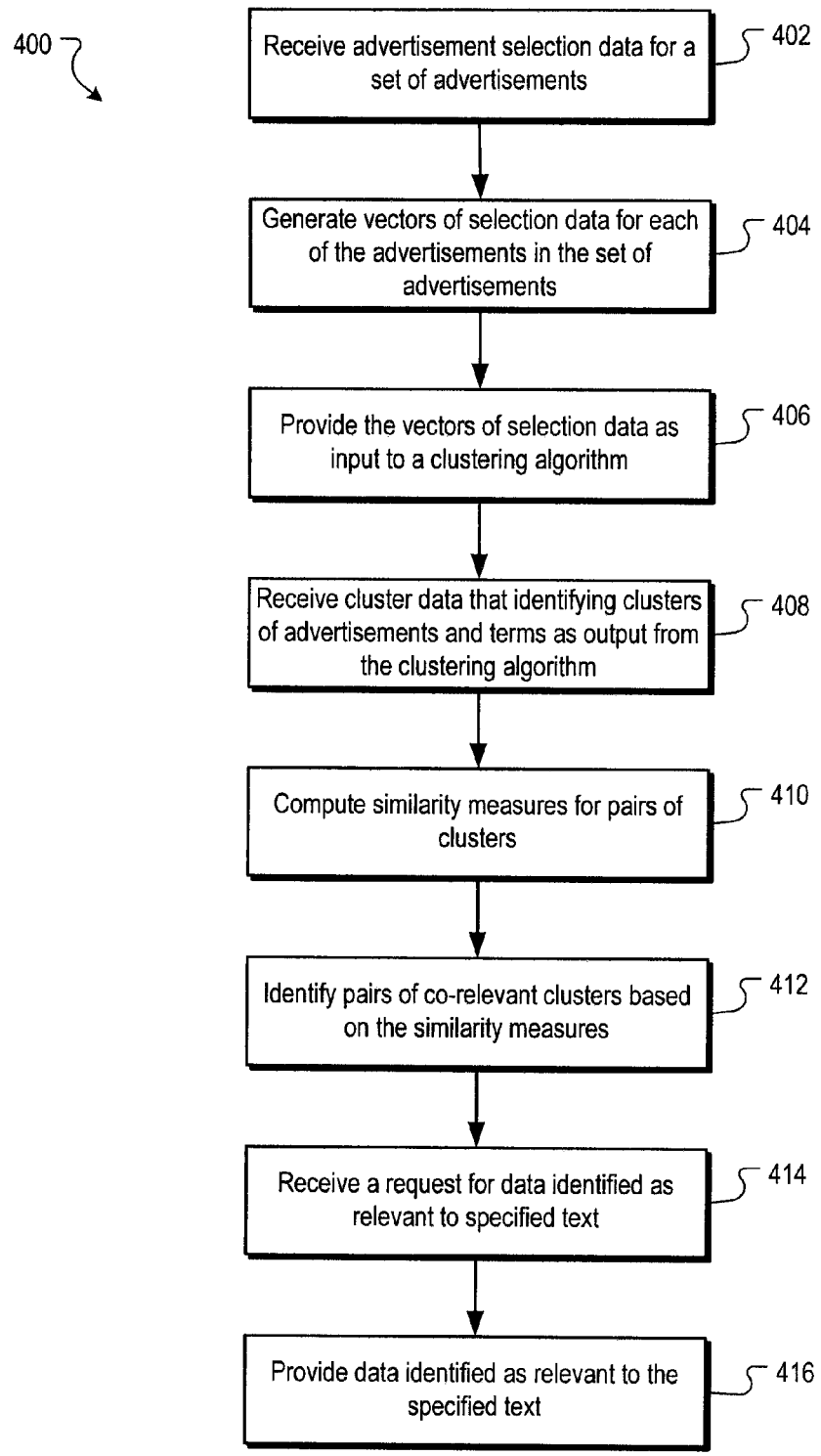
FIG. 4 is a flow chart of an example process for identifying and suggesting relevant data for specified text.

FIG. 4 is a flow chart of an example process 400 for identifying and suggesting relevant data for specified text. In some implementations, the suggested data includes terms and/or advertisements that are relevant to the specified text. The process 400 identifies clusters of advertisements and terms by generating a vector corresponding to each advertisement. The generated vector represents the terms that are associated with the advertisement. The terms that are associated with an advertisement are search queries for which the advertisement was selected from a search results page as specified by advertisement selection data for the advertisement and targeting keywords for the advertisement.

The vectors are input to a clustering algorithm that identifies clusters of vectors representing advertisements and terms. Similarity measures for pairs of clusters are computed and pairs of clusters having at least a threshold similarity measure are identified as clusters that are relevant to a common topic. Clusters that are relevant to a common topic are also referred to as co-relevant clusters, as described in more detail below. Data specifying terms or advertisements that are relevant to the specified text are provided in response to a request for data that are relevant to the specified text.

The process 400 can be implemented, for example, by the analysis subsystem 120 of FIG. 1. In some implementations, the analysis subsystem 120 includes one or more processors that are configured to perform the actions of the process 400. In other implementations, a computer readable medium can include instructions that when executed by a computer cause the computer to perform the actions of the process 400.

Advertisement selection data for a set of advertisements are received (402). In some implementations, the advertisement selection data specifies search queries that caused presentations of the advertisements and user selections of the advertisements in response to the presentations. For example, advertisement selection data can specify that a particular advertisement was presented with a search results page for the search query "basketball" and selected in response to presentation of the advertisement with the search results page.

The advertisement selection data can also specify a selection rate measure for the advertisement when presented with search results pages for a specified search query. The selection rate measure can be a value that represents a number of selections or a relative rate of selections for the advertisement when presented with search results pages for the specified query. The selection measure can be an absolute number of selections for the advertisement (e.g., 100 selections) or a selection rate for the advertisement that is relative to a number of presentations for the advertisements (e.g., click-through-rate).

Vectors of selection data are generated for each of the advertisements (404). In some implementations, the vectors of selection data include a vector component corresponding to each search query for which the advertisement was selected. For example, when an advertisement is selected in response to being presented with search results pages for the search queries "basketball" and "sports," the vector of selection data for the advertisement can include separate vector components for each of the search queries "basketball" and "sports."

In some implementations, the vectors of selection data can include weights corresponding to the selection rate measure of the advertisement for each of the search queries. The weight for each of the search queries can be, for example, a number corresponding to a total number of selections for the advertisement when presented with search results pages for the search query or a relative number of selections for the advertisement. Each relative number of selections can be, for example, a ratio of the total number of selections of the advertisement when presented with search results pages for a particular search query relative to a total number of selections of the advertisement.

The weights can also be normalized, for example, so that each weight is a number between 0.0 and 1.0 corresponding to the number of selections of the advertisement when presented with search results pages for a particular search query relative to the numbers of selections of the advertisement when presented with search results pages for other search queries. For example, assume that a particular advertisement has been selected 90 times and 10 times when presented with search results pages for the search queries "basketball" and "sports," respectively. In this example, the normalized weight for the search query "basketball" can be equal to 0.9 (i.e., 90/(10+90)), while the normalized weight for the search query "sports" can be equal to 0.1 (i.e., 10/(10+90)).

In some implementations, the vectors of selection data can also include vector components representing targeting keywords that are associated with the advertisement. For example, if the advertisement from the example above were associated with the keywords "basketball shoes," "basketball equipment," and "basketballs," a vector component for each of these keywords could be included in the vector of selection data.

The vectors of selection data are provided as input to a clustering algorithm (406). The clustering algorithm can be, for example, an algorithm that implements k-means clustering, Bayesian clustering techniques, or other clustering techniques.

Cluster data that identifies clusters of advertisements and terms is received as output from the clustering algorithm (408). In some implementations, the cluster data can be formatted as an index of advertisements and corresponding terms. The advertisements and terms can be indexed, for example based on a cluster identifier that is associated with each advertisement and keyword that is included in a particular cluster.

For example, two advertisements that are included in a common cluster having a cluster identifier of "cluster1" can each be indexed to the cluster identifier "cluster1." Similarly, the terms corresponding to each of the advertisements can also be indexed to the cluster identifier "cluster1." Thus, each advertisement and corresponding term that is associated with the cluster identifier "cluster1" can be identified from the index based on its association with the cluster identifier "cluster1."

In some implementations, the cluster data can also include a cluster vector that is an aggregate representation of terms that are associated with the advertisements in the cluster. In some implementations, the weights associated with each of the vector components, as described above, can be based on an aggregate number of selections of the advertisements in the cluster when presented with search results pages for the corresponding term. Additionally, the vector components for the keywords of the advertisements can be weighted according to a number of advertisements in the cluster with which the keyword is associated. For example, if a particular keyword is a keyword for four separate advertisements, a weight corresponding to four occurrences can be assigned to the vector component of the keyword.

Similarity measures for pairs of clusters are computed (410). In some implementations, the similarity measures for the pairs of clusters are computed by computing a cosine similarity measure between the vectors representing each of the respective vector clusters. The similarity measures represent a measure of similarity between the terms that are included in each of the clusters relative to the terms that are included in the other cluster. In turn, the similarity measures of each of the clusters to the other cluster is also indicative of likelihood that each of the clusters is relevant to a common topic because the more similar the terms of each of the clusters, the more likely it is that the terms for each of the clusters is relevant to a common topic.

In some implementations, similarity measures are computed between each cluster and every other cluster. In other implementations, similarity measures are only computed for clusters that satisfy a baseline similarity condition. The baseline similarity condition is a minimum similarity that pairs of clusters must have to be eligible to have a similarity measure computed. For example, the similarity condition can require that each of the pairs of clusters contain at least one common term. Thus, in this example, pairs of clusters that do not each contain at least one common term will not be eligible for computation of a similarity score because the pairs of clusters do not satisfy the similarity condition.

Pairs of co-relevant clusters are identified based on the similarity measures (412). Co-relevant clusters are pairs of clusters that have at least a threshold similarity score. The threshold similarity score can be, for example, an absolute similarity score, a similarity score that is within a top X percent of all similarity scores or some other delineation of similarity scores. For example, when the threshold similarity score for co-relevant clusters requires that the similarity score for co-relevant clusters be greater than value Y, any pairs of clusters for which the similarity score is greater than the value Y will be identified as co-relevant clusters. Similarly, when the similarity score requires that the similarity score for co-relevant clusters is within a highest X percent of all similarity scores, pairs of clusters for which the similarity score is one of the highest X percentage of similarity scores will be identified as co-relevant clusters.

The operations of the process 400 that are described above can be performed prior to receipt of a request for data that is relevant to specified text. For example, the operations described above can be performed as an offline process to analyze data previously received for the advertisement. Once the operations described above have been performed data relevant to specified text can be identified according to the operations below.

A request for data identified as relevant to specified text is received (414). In some implementations, the request for data can be a request for an advertisement or a request for terms relevant to a specified text. A request for an advertisement may be received, for example, from an advertisement management system that has received a request for an advertisement to be provided with a search results page for a particular search query for which less than a threshold number of advertisements are identified as relevant.

As described above, when the advertisement management system receives a request to provide an advertisement relevant to a search query the advertisement management system can identify relevant advertisements based on the targeting keywords that are associated with the advertisement. However, when less than a threshold number of advertisements are associated with a targeting keyword that matches the search query, the advertisement management system can request data identifying advertisements that are in a common cluster with the search query, or are included in co-relevant clusters.

A request for terms can be received, for example, as a request for terms that are relevant to specified text of a search query that has been received by the search system. The request for terms can also be received, for example, as a request for resource keywords that are relevant to specified text for a resource. As described above with reference to FIG. 3, the specified text for a request for resource keywords can include n-grams of text that appear on the resource or n-grams of text that is otherwise associated with the resource (e.g., filenames, URLs, etc.).

In response to a request for terms that are relevant to specified text, terms that are included in common clusters as the specified text or co-relevant clusters to the common clusters can be identified in response to the request. Common clusters and corresponding co-relevant clusters are referred to jointly as relevant clusters for the specified text.

Data identified as relevant to the specified text is provided (416). In some implementations, the relevant data for the specified text specifies terms, advertisements or a combination of terms and advertisements that are relevant to the specified text. As described above, the data can be identified as relevant to the specified text based on its inclusion in relevant clusters for the specified text.

In some implementations, the terms and/or advertisements specified by the relevant data are presented in an order corresponding to a measure of relevance of the term and/or advertisement to the specified text. The measure of relevance can be represented, for example as a relevance score of the term and/or advertisement to the specified text.

A relevance score for each term can be computed based on a function of the weights corresponding to the term in each relevant cluster for the specified text. For example, a sum of the weights for a particular term in each of the relevant clusters for the specified text can be specified as the relevance score for the term. Similarly, other functions of the weights, such as a logarithmic function of the weights can be used to compute a relevance score for the term.

The relevance score for an advertisement can be based, for example, the weight of terms matching the specified text that are associated with the advertisement. For example, the terms "basketball" and "basketball shoes" may both satisfy the specified text "basketball." Thus, the aggregate weights for these terms in a vector for the advertisement can be used to compute the relevance of the advertisement to the specified text.

In some implementations, only clusters for which terms matching the specified text have at least a threshold weight are identified as relevant clusters for the specified text. The threshold weight can be a specified numerical weight that a term matching the specified text must have in a cluster for the cluster to be a relevant cluster. Alternatively, the threshold weight can be a weight measure that is computed relative to the other clusters that also include the specified text.

Relevant data for the specified text can be presented, for example, in descending order of relevance scores. For example, when only a specified number of terms and/or advertisements are to be provided in response to a request, the specified number of terms and/or advertisements having the highest relevance scores can be provided. For example, assuming that 10 terms that are relevant to specified text are requested, the 10 terms having the highest 10 relevance scores can be provided in descending order of relevance scores in response to the request. Similarly, if only 5 advertisements are requested, the five advertisements having the highest 5 relevance scores to the specified text can be provided in descending order of relevance score.

The factors and functions described above are presented for example purposes. Other factors and functions can be used to identify clusters of data, generate similarity scores for clusters of data and generate relevance scores for data relative to specified terms. For example, relevance scores for terms relative to the specified text can be further based on measures of relevance of the clusters of data for the specified text.

Figure 5:
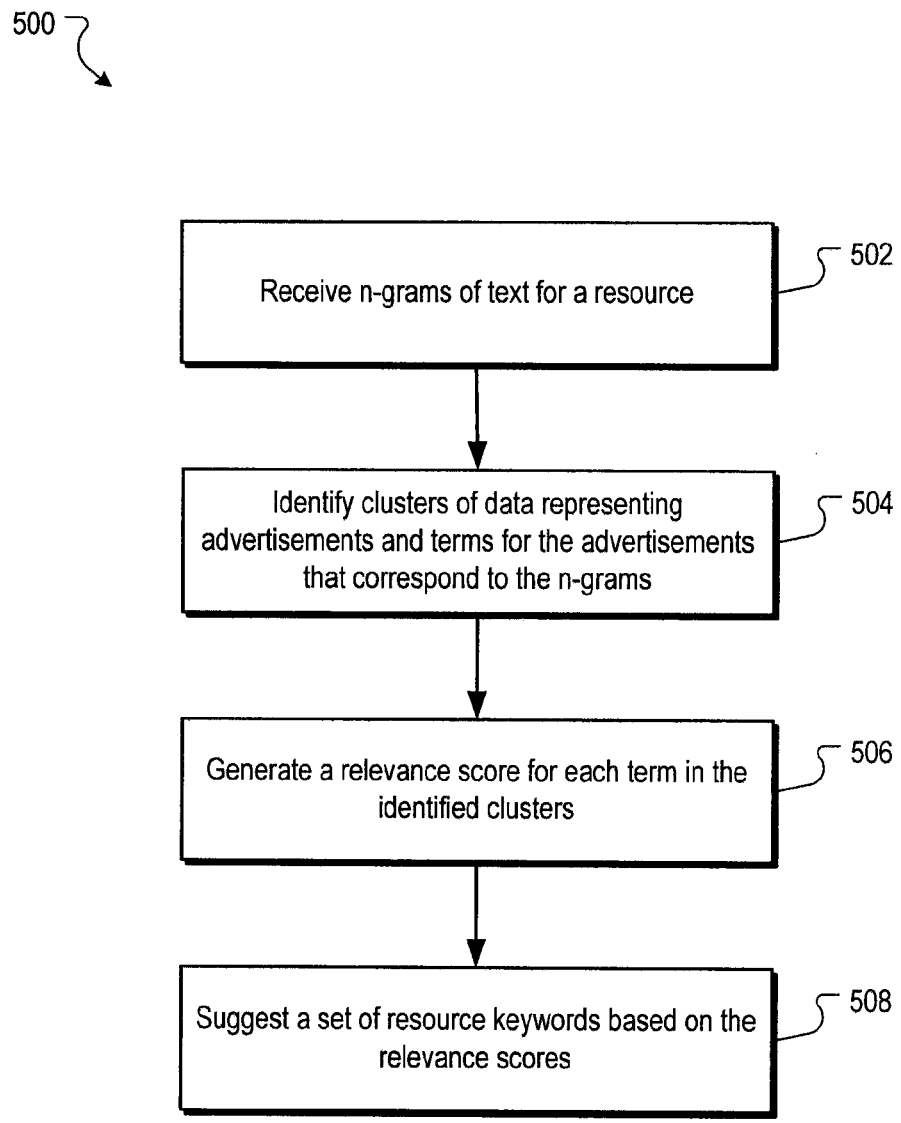
FIG. 5 is a flow chart of an example process for suggesting resource keywords for a resource.

FIG. 5 is a flow chart of an example process 500 for suggesting resource keywords for a resource. The process 500 identifies relevant clusters for n-grams of text that are parsed from the resource. Relevance scores are generated for each term in the relevant clusters for the n-grams specifying a relevance of the terms to the n-grams. In turn, a specified number of terms having highest relevance scores for the n-grams are suggested as resource keywords for the resource.

The process 500 can be implemented, for example, by the analysis subsystem 120 of FIG. 1. In some implementations, the analysis subsystem 120 includes one or more processors that are configured to perform the actions of the process 500. In other implementations, a computer readable medium can include instructions that when executed by a computer cause the computer to perform the actions of the process 500.

N-grams of text are received for a resource (502). The n-grams of text include text that is presented to a user when the resource is presented on a user device. The n-grams of text can also include text that is otherwise associated with the resource, such as filenames for the resource, URLs for the resource, or anchor text for links to the resource that appear on other resources. The n-grams can be generated, for example, by parsing the text that is associated with the resource into n-grams that each includes n terms.

Clusters of data corresponding to the n-grams and representing advertisements and terms for the advertisements are identified (504). In some implementations, the clusters that correspond to the n-grams are relevant clusters for the n-gram that include one or more terms of the n-gram. As described above with reference to FIG. 4, relevant clusters include clusters that include terms matching the specified text and co-relevant clusters for the clusters. For example, clusters that correspond to a bi-gram "basketball shoes" may include clusters that include both terms "basketball" and "shoes" the bi-gram "basketball shoes." The clusters can be identified for example, by identifying the n-gram in an index of terms that are included in the clusters and identifying cluster identifiers that are associated with the terms of the n-gram.

A relevance score is generated for each term in the identified clusters (506). In some implementations, the relevance scores for the terms can be based on a function of the weights associated with the terms in the identified clusters, as described above with reference to FIG. 4.

A set of resource keywords are suggested for the resource based on the relevance scores (508). In some implementations, the set of resource keywords are a specified number of the terms in the identified clusters that satisfy a relevance score threshold. The relevance score threshold can specify that the set of resource keywords that are suggested be terms having a highest relevance score relative to the n-grams for the resource, as described above with reference to FIG. 4.

Suggesting resource keywords is described for example purposes. However, keywords relevant to any specified text can be suggested in a similar manner to that described above. For example, targeting keywords for advertisements can be suggested based on text of the advertisement or otherwise associated with the advertisement. Targeting keywords can also be suggested for advertisements based on terms that are included in common clusters with the advertisement or co-relevant clusters for the common clusters.

Figure 6:
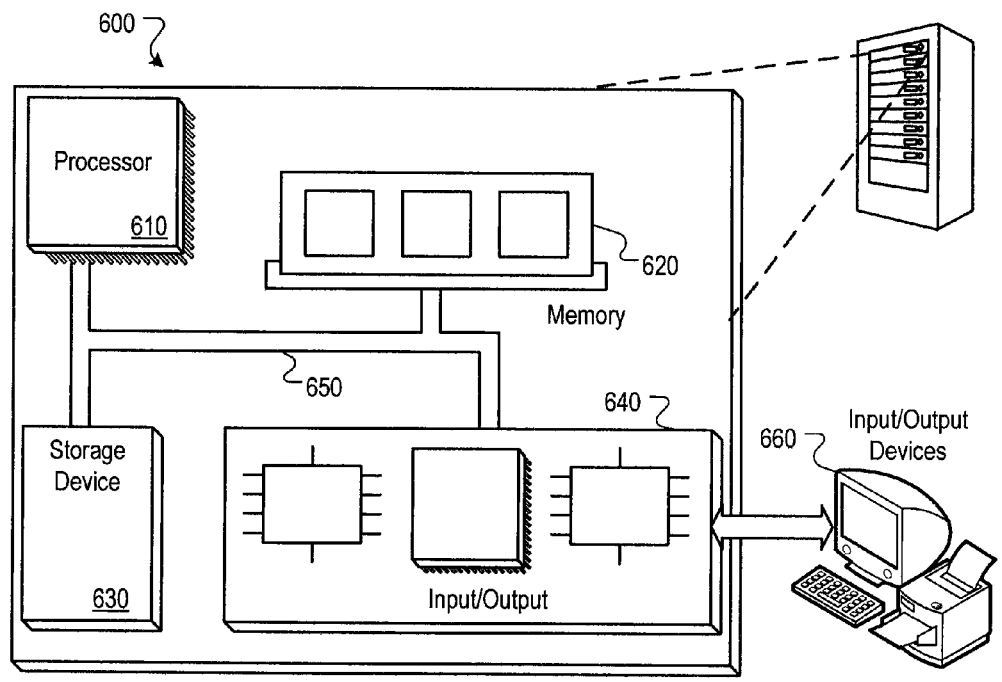
FIG. 6 is block diagram of an example computer system that can be used to facilitate advertisement selection data clustering.

FIG. 6 is block diagram of an example computer system 600 that can be used to facilitate advertisement selection data clustering. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The analysis subsystem 120 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The analysis subsystem 120 and/or advertisement management system 110 can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    accessing, by a data processing device, selection data for a plurality of advertisements, the selection data specifying search queries for which the advertisements were presented and user selections of the advertisements in response to the presentations;
    creating, by the data processing device, clusters of terms and corresponding advertisements based on the selection data, each of the clusters including multiple corresponding advertisements and each of the corresponding advertisements in each cluster having a respective term vector that is within a threshold distance of each other term vector for other corresponding advertisements in the cluster, each term vector for a corresponding advertisement specifying the search queries for which the corresponding advertisement was both presented to a user and selected by the user, the term vector also specifying advertiser-designated keywords for the corresponding advertisement that triggered presentations of the corresponding advertisement, wherein at least one of the advertiser-designated keywords is not included in text of the search queries, and wherein creating the clusters comprises determining cluster vectors for the clusters, each cluster vector for a respective cluster being an aggregate representation of term vectors for each of multiple corresponding advertisements in the respective cluster;
    computing, by the data processing device, similarity measures between pairs of the clusters, each similarity measure for a pair of clusters being based on a distance between a cluster vector for a first cluster of the pair and a cluster vector for a second cluster of the pair;
    receiving, by the data processing device, a request for data identified as relevant to specified text;
    in response to the request:
        identifying, from the clusters, a particular duster that includes a term matching the specified text;
        identifying, from the clusters, a co-relevant cluster for the particular cluster, the co-relevant cluster being identified based on the computed similarity measure between the particular cluster and the co-relevant cluster meeting a threshold similarity measure, the co-relevant cluster being a different cluster than the clusters that include the term matching the specified text; and
        providing, by the data processing device, data from the particular cluster and data from the co-relevant cluster.

2. The method of claim 1, wherein providing data comprises providing search queries from each of the particular cluster and the co-relevant cluster, each of the provided search queries having a relevance measure for the specified text that meets a relevance threshold.

3. The method of claim 1, wherein providing data comprises providing advertisements corresponding to each of the particular cluster and the co-relevant cluster, each of the provided advertisements having a relevance measure for the specified text that meets a relevance threshold.

4. The method of claim 1, wherein creating clusters of terms and corresponding advertisements comprises:
    generating vectors of selection data for each of the advertisements, each of the vectors including weights corresponding to a measure of selections of one of the advertisements when presented based on the search queries;
    providing the vectors as input to a clustering algorithm; and
    receiving cluster data specifying clusters of terms and corresponding advertisements based on the vectors.

5. The method of claim 4, wherein computing similarity measures comprises computing a similarity measure for each cluster relative to other clusters based on a cosine similarity function of the cluster vectors of the clusters, the cluster vector for each of the clusters specifying, for each term in the cluster, a value based on:
    a number of corresponding advertisements in the cluster that have been selected when provided in response to a search query that matches the term; and
    a number of the corresponding advertisements that are targeted using a keyword that matches the term.

6. The method of claim 1, wherein providing data comprises providing data suggesting resource keywords for a website, each suggested resource keyword having a relevance score for textual content of the website that meets a relevance threshold.

7. The method of claim 1, wherein the selection data for each advertisement are represented by a vector in which each component has a weight representing a measure of selection for the advertisement when presented based on a search query corresponding to the component.

8. The method of claim 1, wherein providing data comprises:
computing, for each of the terms in the particular cluster and each of the terms in the co-relevant cluster, a relevance score indicative of a measure of relevance of the term to the specified text; and
providing the terms having a relevance score that satisfies a relevance threshold.

9. A system, comprising:
a data store storing advertisement selection data for a set of advertisements, the selection data specifying selections of the advertisements from search results pages for search queries;
an advertisement management system comprising one or more processors configured to receive specified text and provide advertisements that are relevant to the specified text based on targeting keywords for the advertisements matching the specified text; and
an ad-selection analysis subsystem coupled to the data store and the advertisement management system, the ad-selection analysis subsystem including one or more processors configured to perform operations including:
creating clusters of terms and corresponding advertisements based on the advertisement selection data, each of the clusters including multiple corresponding advertisements and each of the corresponding advertisements in each cluster having a term vector that is within a threshold distance of each other term vector for other corresponding advertisements in the cluster, each term vector for a corresponding advertisement specifying the search queries for which the corresponding advertisement was both presented to a user and selected by the user, the term vector also specifying advertiser-designated keywords for the corresponding advertisement that triggered presentations of the corresponding advertisement, wherein at least one of the advertiser-designated keywords is not included in the search queries, and wherein creating the clusters comprises determining cluster vectors for the clusters, each cluster vector for a respective cluster being an aggregate representation of term vectors for each of multiple corresponding advertisements in the respective cluster;
computing similarity measures between pairs of the clusters, each similarity measure for a pair of clusters being based on a distance between a cluster vector for a first cluster of the pair and a cluster vector for a second cluster of the pair;
receiving a request for data identified as relevant to specified text;
in response to the request:
identifying, from the clusters, a particular cluster that includes a term matching the specified text;
identifying, from the clusters, a co-relevant cluster for the particular cluster, the co-relevant cluster being identified based on the computed similarity measure between the particular cluster and the co-relevant cluster meeting a threshold similarity measure, the co-relevant cluster being a different cluster than the clusters that include the term matching the specified text; and
providing data identified as relevant to the specified text, the data specifying at least one additional advertisement that is relevant to the specified text, the additional advertisement being one of the corresponding advertisements from the co-relevant cluster.

10. The system of claim 9, wherein the ad-selection analysis subsystem is further configured to perform operations including:
generating vectors of selection data for each of the advertisements, each of the vectors including weights corresponding to a measure of selections of one of the advertisement when presented with search results pages for the search queries;
providing the vectors as input to a clustering algorithm; and
receiving data specifying clusters of terms and corresponding advertisements based on the vectors.

11. The system of claim 9, wherein the ad-selection analysis subsystem is further configured to perform operations including computing a similarity measure for each cluster relative to other clusters based on a cosine similarity function of the cluster vectors for the clusters, the cluster vector for each of the clusters specifying, for each term in the cluster, a value based on:
a number of corresponding advertisements in the cluster that have been selected when provided in response to a search query that matches the term; and
a number of the corresponding advertisements that are targeted using a keyword that matches the term.

12. The system of claim 9, wherein the ad-selection analysis subsystem is further configured to perform operations including:
receiving a request for relevant resource keywords for resource text;
identifying, from the clusters, relevant resource keywords for the resource text, the relevant resource keywords including at least one relevant term from a first cluster that includes a term matching the resource text and at least one relevant term from a co-relevant cluster for the first cluster, the co-relevant cluster being identified based on the computed similarity measure between the first cluster and the co-relevant cluster for the first cluster; and
providing data specifying the relevant terms in response to the request.

13. A computer storage device encoded with a computer program comprising instructions that when executed operate to cause a computer to perform operations comprising:
accessing selection data for a plurality of advertisements, the selection data specifying search queries for which the advertisements were presented and user selections of the advertisements in response to the presentations;
creating clusters of terms and corresponding advertisements based on the selection data, each of the clusters including multiple corresponding advertisements and each of the corresponding advertisements in each cluster having a term vector that is within a threshold distance of each other term vector for other corresponding advertisements in the cluster, each term vector for a corresponding advertisement specifying the search queries for which the corresponding advertisement was both presented to a user and selected by the user, the term vector also specifying advertiser-designate keywords for the corresponding advertisement that triggered presentations of the corresponding advertisement, wherein at least one of the advertiser-designated keywords is not included in the search queries, and wherein creating the clusters comprises determining cluster vectors for the clusters, each cluster vector for a respective cluster being an aggregate representation of term vectors for each of multiple corresponding advertisements in the respective cluster;

computing-similarity measures between pairs of the clusters, each similarity measure for a pair of clusters being based on a distance between a cluster vector for a first cluster of the pair and a cluster vector for a second cluster of the pair;

receiving a request for data identified as relevant to specified text;

in response to the request:
  identifying, from the clusters, a particular cluster that includes a term matching the specified text;
  identifying, from the clusters, a co-relevant cluster for the particular cluster, the co-relevant cluster being identified based on the computed similarity measure between the particular cluster and the co-relevant cluster meeting a threshold similarity measure, the co-relevant cluster being a different cluster than the clusters that include the term matching the specified text; and
  providing data from the particular cluster and data from the co-relevant cluster.

14. The computer storage device of claim 13, further comprising instructions that when executed cause the computer to perform operations further comprising:
  computing, for each of the terms in the particular cluster and each of the terms in the co-relevant cluster, a relevance score indicative of a measure of relevance of the term to the specified text; and
  providing the terms having a relevance score that satisfies a relevance threshold.

15. The method of claim 1, wherein providing data comprises:
  computing, for each particular term in both the particular cluster and the co-relevant cluster, a relevance score indicative of a measure of relevance of the term to the specified text, wherein computing the relevance score comprises:
  for each particular term, aggregating advertisement selection rate weights for the particular term from the particular cluster and the co-relevant cluster; and
  computing the relevance score based on the aggregated relevance weight.

* * * * *

UNITED STATES PATENT AND TRADEMARK OFFICE
CERTIFICATE OF CORRECTION

PATENT NO. : 8,463,783 B1  
APPLICATION NO. : 12/498036  
DATED : June 11, 2013  
INVENTOR(S) : Niyati Yagnik Page 1 of 1

It is certified that error appears in the above-identified patent and that said Letters Patent is hereby corrected as shown below:

In the Claims:

Claim 1, Column 16, Line 23 – delete "duster" and insert -- cluster --, therefor.

Claim 13, Column 18, Line 65 – delete "advertiser-designate" and insert -- advertiser-designated --, therefor.

Signed and Sealed this
Tenth Day of September, 2013

Teresa Stanek Rea
*Acting Director of the United States Patent and Trademark Office*